US012763302B2

(12) United States Patent
Le Blanc et al.

(10) Patent No.: US 12,763,302 B2
(45) Date of Patent: Oct. 13, 2026

(54) SYSTEMS AND METHODS FOR IMPROVED INTENSITY DETERMINATIONS IN MASS ANALYSIS INSTRUMENTS

(71) Applicant: DH Technologies Development Pte. Ltd., Singapore (SG)

(72) Inventors: Yves Le Blanc, Newmarket (CA); Stephen Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 332 days.

(21) Appl. No.: 18/560,458

(22) PCT Filed: May 11, 2022

(86) PCT No.: PCT/IB2022/054412
§ 371 (c)(1),
(2) Date: Nov. 13, 2023

(87) PCT Pub. No.: WO2022/238945
PCT Pub. Date: Nov. 17, 2022

(65) Prior Publication Data
US 2024/0258090 A1 Aug. 1, 2024

Related U.S. Application Data

(60) Provisional application No. 63/188,883, filed on May 14, 2021.

(51) Int. Cl.
*H01J 49/00* (2006.01)
*H01J 49/16* (2006.01)

(52) U.S. Cl.
CPC ........ *H01J 49/0031* (2013.01); *H01J 49/165* (2013.01)

(58) Field of Classification Search
CPC ........ H01J 49/00; H01J 49/02; H01J 49/0031; H01J 49/165; H01J 49/0445; H01J 49/0454; H01J 49/044
(Continued)

(56) References Cited

U.S. PATENT DOCUMENTS 5,995,989 A * 11/1999 Gedcke .................. G06T 9/001 708/203
6,369,382 B1 4/2002 Ito et al.
(Continued)

FOREIGN PATENT DOCUMENTS

| | | |
|---|---|---|
| EP | 3460470 | 3/2019 |
| EP | 3460479 | 3/2019 |

(Continued)

OTHER PUBLICATIONS

Benijts, Tom et al., "Analysis of Multiple Endocrine Disruptors in Environmental Waters via Wide-Spectrum Solid-Phase Extraction and Dual-Polarity Ionization LC-Ion Trap-MS/MS", Analytical Chemistry, Dec. 30, 2003, pp. 704-711; retrieved from the internet:https://pubs.acs.org/doi/10.1021/ac035062x?src=getftr.
(Continued)

*Primary Examiner* — Jason L McCormack
(74) *Attorney, Agent, or Firm* — Merchant & Gould P.C.

(57) ABSTRACT

Systems and methods for performing mass analysis. An example method may include ejecting, from a first well of a well plate, a first sample into a transport fluid; ionizing the first sample and the transport fluid to generate first ions; detecting the first ions over a first period of time; and when a count rate of the detected first ions is above a background count rate threshold, accumulating a count of the detected first ions. The method may also include ejecting, from a second well of the well plate, a second sample into the transport fluid; ionizing the second sample and the transport
(Continued)

fluid to generate second ions; detecting the second ions over a second period of time; and when a count rate of the detected second ions is above the background count rate threshold, accumulating a count of the detected second ions.

8 Claims, 11 Drawing Sheets

(58) Field of Classification Search
USPC .................................................. 250/281, 282
See application file for complete search history.

(56) References Cited

U.S. PATENT DOCUMENTS

| | | | | |
|---|---|---|---|---|
| 6,416,164 | B1 | 7/2002 | Stearns et al. | |
| 7,923,681 | B2 | 4/2011 | Collings et al. | |
| 8,378,293 | B1 | 2/2013 | Quimby | |
| 8,467,988 | B1 | 6/2013 | Roeder et al. | |
| 10,770,277 | B2 | 9/2020 | Datwani et al. | |
| 2007/0164205 | A1 | 7/2007 | Truche | |
| 2008/0237458 | A1 | 10/2008 | Wang | |
| 2009/0194679 | A1 * | 8/2009 | Doherty | H01J 49/0045 250/288 |
| 2009/0212205 | A1 | 8/2009 | Thomson et al. | |
| 2012/0228489 | A1 | 9/2012 | Hohndorf | |
| 2013/0334416 | A1 * | 12/2013 | Satake | H01J 49/0431 250/288 |
| 2014/0283628 | A1 | 9/2014 | Hattingh et al. | |
| 2014/0306106 | A1 | 10/2014 | Olney | |
| 2018/0011990 | A1 | 1/2018 | Moseley et al. | |
| 2018/0182603 | A1 | 6/2018 | Schmidt | |
| 2018/0211213 | A1 | 7/2018 | Vivier | |
| 2019/0043703 | A1 | 2/2019 | Bern et al. | |
| 2019/0157060 | A1 | 5/2019 | Datwani et al. | |
| 2019/0250168 | A1 | 8/2019 | Valkenborg et al. | |
| 2019/0383840 | A1 | 12/2019 | Wiederin | |
| 2020/0021444 | A1 | 1/2020 | Young et al. | |
| 2020/0098552 | A1 | 3/2020 | Young et al. | |
| 2020/0363783 | A1 | 11/2020 | Tate | |
| 2021/0109069 | A1 * | 4/2021 | Jones | H01J 49/0031 |
| 2021/0111013 | A1 | 4/2021 | Quarmby | |
| 2021/0168124 | A1 | 6/2021 | Suter | |
| 2021/0305035 | A1 | 9/2021 | Smith | |
| 2021/0305991 | A1 | 9/2021 | Smith | |
| 2021/0335589 | A1 | 10/2021 | Bern et al. | |
| 2021/0394171 | A1 | 12/2021 | Datwani et al. | |
| 2022/0139690 | A1 | 5/2022 | Covey et al. | |
| 2022/0359178 | A1 | 11/2022 | Le Blanc | |
| 2023/0343574 | A1 | 10/2023 | Chen et al. | |
| 2023/0410952 | A1 | 12/2023 | Tate | |
| 2024/0014020 | A1 | 1/2024 | Carlisle | |
| 2024/0339311 | A1 | 10/2024 | Covey | |
| 2024/0379336 | A1 | 11/2024 | Liu | |
| 2024/0412962 | A1 | 12/2024 | Duschoslav | |
| 2025/0069873 | A1 | 2/2025 | Ivosev | |
| 2025/0149319 | A1 | 5/2025 | Burton | |
| 2025/0308871 | A1 | 10/2025 | Aw | |

FOREIGN PATENT DOCUMENTS

| | | |
|---|---|---|
| WO | 2017/153726 | 9/2017 |
| WO | 2019/229449 | 12/2019 |
| WO | 2020/203134 | 10/2020 |
| WO | 2022/157625 | 7/2022 |
| WO | 2023/131850 | 7/2023 |

OTHER PUBLICATIONS

Gardner, W. et al., "Understanding mass spectrometry images: complexity to clarity with machine learning", vol. 112, No. 4, Sep. 16, 2020, 17 pages.
Hever, H. et al., "Diversity matters: optimal collision energies fortandem mass spectrometric analysis of a large set of N-Glycopeptides", Journal of Proteome Research, vol. 21, No. 11, Oct. 6, 2022, pp. 2743-2753.
Jetybayeva, A. et al., "A review on recent machine learning applications for imaging mass spectrometry studies", Journal of Applied Physics, vol. 133, No. 2, Jan. 12, 2023, 37 pages.
Liu, Y. et al., "Current and future deep learning algorithms fortandem mass spectrometry (MS/MS)-based small molecule structure elucidation", Rapid Communications in Mass Spectrometry, no. Special Issue Perspective, e9120, May 26, 2021, 16 pages.
Neumann, S. et al., "Computational mass spectrometry for metabolites and small molecules", Analytical and Bioanalytical Chemistry, vol. 398, No. 7-8, Oct. 9, 2010, pp. 2779-2788.
Skinnider, M.A. et al., "A deep generative model enables automated structure elucidation of novel psychoactive substances", Nature Machine Intelligence, vol. 13, No. 11, Nov. 15, 2021, 24 pages.
Smets, T. et al., "Evaluation of distance metrics and spatial autocorrelation in uniform manifold approximation and projection applied to mass spectrometry imaging data", Analytical Chemistry, vol. 91, No. 9, Apr. 15, 2019, pp. 5706-5714.
Zhvansky, E. et al., "Comparison of dimensionality reduction methods in mass spectra of astrocytoma and glioblastoma tissues", Mass Spectrometry, vol. 10, No. 1, A0094, Mar. 13, 2021, 9 pages.
Anonymous, "Dataanalysis 4.0 reference manual", Oct. 1, 2009, pp. 1-404, retrieved from the internet on May 8, 2023 at: http://pubdata.theorchromo.ru/manuals/Bruker/DataAnalysis%20Reference%20Manual.pdf, attaching sections 6.1 and 6.3 and figures 6-5, 6-10, 6-13, 6-15, and 6-17 only (16 pages).
Anonymous, "ICP-MS Inductively Coupled Plasma Mass Spectrometry, A Primer", Agilent Technologies, Dec. 31, 2005, 84 pgs.
Anonymous, "Voyager Biospectrometry Workstation—User Guide", Applied Biosystems, Jan. 1, 2000, retrieved from the internet on Jul. 11, 2016 at: http://www.niu.edu/analyticallab/_pdf/maldi/voyager-v51-userguide.pdf, 107 pages.
Anonymous, "Waters Quattro micro API Mass Spectrometer Operator's Guide 71500058602/Revision D", Jan. 1, 2010, pp. 1-256.
Duhrkop, Kai et al., "Searching molecular structure databases with tandem mass spectra using CSI:FingerID", PNAS, Oct. 13, 2015, vol. 112, No. 41, pp. 12580-12585.
Guan, Pengwei et al., "Full Collision Energy Ramp-MS2 Spectrum in Structural Analysis Relying on MS/MS", Analytical Chemistry 2021, 93, 15381-15389.
Hager et al., "Product ion scanning using a Q-q-Q linear ion trap (Q Trap) mass spectrometer", Rapid Communications in Mass Spectrometry (2003; 17:1056-1064.
Hasegawa, Koutaro et al., "The standard addition method and its validation in forensic toxicology", Forensic Toxicology, Tokyo, Springer, vol. 39, No. 2, Jun. 4, 2021, pp. 311-333.
Jaquet-Chiffelle, David et al., "Tamperproof timestamped provenance ledger using blockchain technology", Forensic Science International: Digital Investigations 33 (2020; 300977), 18 pgs.
Lermyte, Frederik et al., "Mind: A double-linear model to acurately determine monoisotopic precursor mass in high- resolution top-down proteomics", Analytical Chemistry, vol. 91, No. 15, Jul. 8, 2019, pp. 10310-10319.
Mortishire-Smith, Russel et al., Waters, White Paper, "Intelligent Data Capture: Real-Time Noise Reduction for High Resolution Mass Spectrometry", Jan. 1, 2016, pp. 1-6.
PCT International Preliminary Report on Patentability in International Application PCT/IB2022/054412, mailed Nov. 23, 2023, 11 pages.
PCT International Search Report and Written Opinion in International Application PCT/IB22022/054412, mailed Jul. 20, 2022, 15 pages.
Pohl, Kerstin et al., "Analysis of locked nucleic acid (LNA) oligoncleotides (ON) and related impurities using accurate mass spectrometry", Sciex, Dec. 11, 2020, 4 pgs.
Senko et al., "Determination of monoisotopic masses and ion populations for large biomolecules from resolved isotopic distributions", J. Am. Soc. Mass. Spectrum, 1995(6), 229-233.
Shrivastava, Aditya et al., "MassGenie: a transformer-based deep learning method for identifying small molecules from their mass spectra", Biomolecules 2021, 11, 1793, 23 pgs.

(56) References Cited

OTHER PUBLICATIONS

Stravs, Michael et al., “MSNovelist: de novo structure generation from mass spectra”, Nature Methods, vol. 19, Jul. 2022, pp. 865-870.
Van Berkel, Gary et al., “Immediate frop on demand technology (I-DOT) coupled with mass spectrometry via an open port sampling interface”, Bioanalysis, vol. 9, No. 21, Nov. 2, 2017, pp. 1667-1679.
Winkler, Robert, “ESIprot: a universal tool for charge state determination and molecular weight calculation of proteins from electrospray ionization mass spectrometry data: ESIprot: a universal tool for the analysis of protein ESI-MS data”, Rapid Communications in Mass Spectrometry, vol. 24, No. 3, Feb. 15, 2010, pp. 285-294.
Zhang, Hui et al., “Acoustic Ejection Mass Spectrometry for High-Throughput Analysis”, bioRxiv, Jan. 29, 2020, 32 pgs.
Zubarev, R.A., et al., “An A priori relationship between the average and monoisotopic masses of peptides and oligonucleotides”, Rapid Communications in Mass Spectrometry, 1991(5), 276-277.
Zubarev, Roman et al., “Early life relict feature in peptide mass distribution”, Central European Journal of Biology, 2019, vol. 5, pp. 190-196.

* cited by examiner

100

400A

400B

700

SYSTEMS AND METHODS FOR IMPROVED INTENSITY DETERMINATIONS IN MASS ANALYSIS INSTRUMENTS

CROSS REFERENCE TO RELATED APPLICATION

This application is a National Stage Application of PCT/IB2022/054412, filed on May 11, 2022, which claims the benefit of U.S. Provisional Application No. 63/188,883, filed on May 14, 2021, the entire disclosures of which are incorporated herein by reference in their entireties. To the extent appropriate, a claim of priority is made to each of the above disclosed applications.

INTRODUCTION

Mass analysis instruments, such as mass spectrometers, are generally used to characterize the composition of samples, including for instance, pharmaceutical samples in drug trials, and the like. Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample, among other things. Given its sensitivity and selectivity, MS is particularly important in life science applications. A laboratory may have one mass analysis instrument or hundreds, depending upon their needs. Each of these mass analysis instruments generates large amounts of data, which needs to be processed, stored, and/or communicated. In addition, this data often needs to be reviewed and analyzed by scientists or lab members.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for improving intensity determinations in mass analysis instruments. In an aspect, the technology relates to a method for performing mass analysis. The method includes ejecting, from a first well of a well plate, a first sample into a transport fluid; ionizing the first sample and the transport fluid to generate first ions; detecting the first ions over a first period of time; when a count rate of the detected first ions is above a background count rate threshold, accumulating a count of the detected first ions; storing the total accumulated count of first ions as an intensity for the first well of the well plate; ejecting, from a second well of the well plate, a second sample into the transport fluid; ionizing the second sample and the transport fluid to generate second ions; detecting the second ions over a second period of time; when a count rate of the detected second ions is above the background count rate threshold, accumulating a count of the detected second ions; and storing the total accumulated count of second ions as an intensity for the second well of the well plate.

In an example, the method further includes generating a report for the well plate, wherein the report includes the first intensity correlated with the first well and the second intensity correlated with the second well. In another example, the background count rate threshold is based on a count rate for the transport fluid. In still another example, the method further includes generating the background count rate threshold by: ionizing the transport fluid to generate transport ions; detecting the transport ions; determining an average count rate of the detected transport ions; and generating the background count rate threshold based on the determined average count rate. In yet another example, the first sample is acoustically ejected as a droplet from the first well. In a further example, the first time period is based on a time of ejection of the first sample and a time of ejection of the second sample. In still yet another example, the first time period begins when the count rate of the detected first ions is first above the background count rate threshold and ends when the count rate of the detected first ions falls below the background count rate threshold. In another example, the first time period is between 0.2 to 2 seconds. In a further example, the method is performed as a multiple reaction monitoring (MRM) analysis of the sample.

In another aspect, the technology relates to a method for performing mass analysis. The method includes ejecting a sample into a transport fluid; ionizing the sample and the transport fluid to create ions; detecting the ions; sampling the count of the detected ions at a sampling interval; for each sampling interval where an ion count is higher than a background ion count threshold, adding, to an intensity bin for the sample, an ion count corresponding to a difference between the ion count rate and the background count threshold; and generating an intensity for the sample based on a total ion count in the intensity bin.

In an example, the background ion count threshold is based on a count rate for the transport fluid. In a further example, the method further includes generating the background count rate threshold by: ionizing the transport fluid without the sample to generate transport ions; detecting the transport ions; determining an average count rate of the detected transport ions; and generating the background count rate threshold based on the determined average count rate. In another example, the background count rate threshold is further based on a deviation of a count rate of the detected transport ions from the average count rate. In yet another example, the sample is acoustically ejected as a droplet. In still another example, the method is performed as a multiple reaction monitoring (MRM) analysis of the sample. In still yet another example, adding the ion count to the intensity bin occurs during a time period based on the time the sample was ejected. In another example, the sample is ejected from a well of a well plate, and the method further comprises generating a report for the well plate including the generated intensity of the sample.

In another aspect, the technology relates to a method for performing mass analysis. The method includes ionizing a sample and transport fluid to generate ions; accelerating the ions towards a detector; detecting the ions; when a first count rate of the of the detected ions having a first mass-to-charge ratio is greater than a background count rate threshold for the first mass-to-charge ratio, adding, to an intensity bin for the first mass-to-charge ratio, ions corresponding to a difference between the first count rate and the background count rate threshold for the first mass-to-charge ratio; when a second count rate of the of the detected ions having a second mass-to-charge ratio is greater than a background count rate threshold for the second mass-to-charge ratio, adding, to an intensity bin for the second mass-to-charge ratio, ions corresponding to a difference between the second count rate and the background count threshold for the second mass-to-charge ratio; and generating a mass spectrum for the sample based on the ion count in the intensity bin for the first mass-to-charge ratio and the ion count in the intensity bin for the second mass-to-charge ratio.

In an example, the background count rate threshold for the first mass-to-charge ratio is based on a count rate for the transport fluid. In another example, the method further includes generating the background count rate threshold for the first mass-to-charge ratio by: ionizing the transport fluid without the sample to generate transport ions; detecting the transport ions; determining an average count rate of the detected transport ions having the first mass-to-charge ratio; and based on the determined average count rate, generating the background count rate threshold for the first mass-to-charge ratio.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
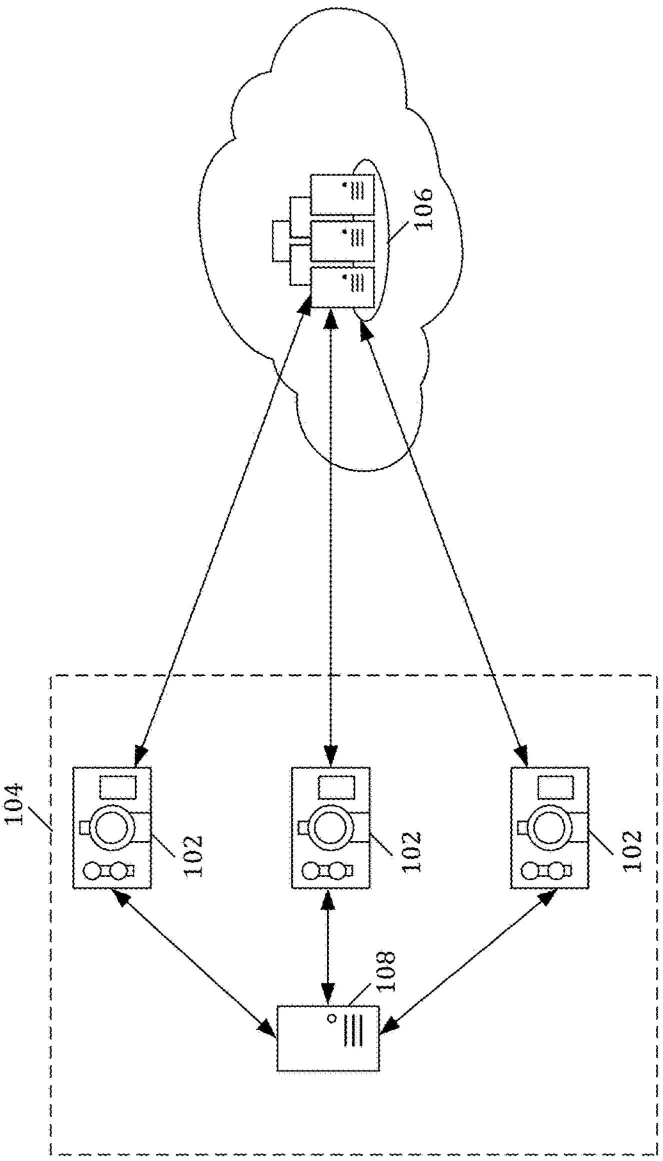
FIG. 1 depicts an example system of mass spectrometry instruments.

High-throughput sample analysis may be critical to the drug discovery process, among other processes. Mass spectrometry (MS) based methods can achieve label-free, universal mass detection of a wide range of analytes with exceptional sensitivity, selectivity, and specificity. As a result, there is significant interest in improving the throughput of MS-based analysis for drug discovery. In particular, a number of sample introduction systems for MS-based analysis have been improved to provide higher throughput. Acoustic droplet ejection (ADE) has been combined with an open port interface (OPI) to provide a sample introduction system for high-throughput mass spectrometry. When an ADE device and OPI are coupled to a mass spectrometer, the system can be referred to as an acoustic ejection mass spectrometry (AEMS) system. The analytical performance (sensitivity, reproducibility, throughput, etc.) of an AEMS system depends on the performance of the ADE device and the OPI. The performance of the ADE device and the OPI depends on selecting the operational conditions or parameters for these devices.

AEMS technology brings fast, precisely controlled, low-volume sampling to the direct high-flow liquid transferring to the ESI without carry-over, to achieve this high-throughput analytical platform with high reproducibility, and wide compound coverage. The analytical throughput of an AEMS system is determined by the delay time between ejections from different sampling events, with the consideration of being able to accurately identify and quantify the compounds from the potential interference of adjacent ejections.

While high-throughput analysis or screening improves throughput, the mass spectrometer may generate a significantly large amount of data as a result of the increased throughput. This increasing amount of data requires an increasing amount of storage (e.g., memory), bandwidth for transmitting such data, and processing power for analyzing the data. In addition, the increased amount of data may create bottleneck for manual review and generation of final results. In an example of AEMS, a well plate having 384 wells may have droplets ejected from the wells at a rate of 2-3 Hz. Ion count data may be continuously generated throughout the analysis process, generating a substantially continuous time signal of ion intensity. The total amount of that data produced may not be necessary in all scenarios. For instance, in a multiple reaction monitoring (MRM) analysis, the final information desired may be the total amount or intensity of an analyte present in each well. The data output from the mass spectrometry device, however, has significantly more information than that data point for each well. In the above example, if the well plate is analyzed twice, 768 peaks for each of the wells would need to be resolved and integrated to determine the amount of analyte present in each well.

The present technology, among other things, addresses the data generation issues discussed above. The present technology is able to reduce the total amount of data generated from the mass spectrometry devices to improve storage, bandwidth, and processing requirements. To do so, the present technology may first determine a background count rate threshold that corresponds to a background signal for the wells of a well plate. Then, when a sample analysis is performed, while the ion count rate is higher than the background threshold, the counted ions are accumulated or summed into a bin. The total counted ions for a particular well of a well plate may then correspond to the ions counted during that period and stored in a corresponding bin. Thus, a total ion count or intensity for an analyte may be generated for each well on the well plate without necessarily having to store a full time series of data for the analysis. In addition, the operations may all be performed by the mass analysis instrument itself according to firmware so that the raw data may never need to be exported for further analysis.

In some examples, a well-plate report may be generated that indicates the intensity of each well may be generated. When using an AEMS system, the time of the acoustic ejection of a sample from a well may also be utilized for determining a time period for when the ion accumulation operations should be performed. For instance, a known time occurs between the time the droplet is ejected from the well and when ions generated from that droplet would be detected. Accordingly, time windows for each well may be established to better correlate the results to a particular well and increase the likelihood that only ions from that particular well are included in the results.

FIG. 1 depicts an example system 100 of mass analysis instruments 102. The mass analysis instruments or instruments 102 may be housed in a particular facility 104, such as a laboratory, university, building, campus, or similar type of facility. Each of the mass analysis instruments 102 may include a mass spectrometer, a sample separator (e.g., including, but not limited to, a liquid chromatography device), an acoustic ejection system, and/or similar devices for analyzing the composition of an object. For instance, each of the mass analysis instruments 102 may include a stand-alone mass spectrometer, an on-line liquid chromatography-mass spectrometry (LC-MS), an on-line gas chromatography-mass spectrometry (GC-MS) system, a Fourier-transform ion cyclotron resonance mass spectrometer (FT-ICR-MS), or a tandem mass spectrometry system (MS-MS), among other types of mass analysis systems. While only three mass analysis instruments 102 are depicted as being in the facility 104, it should be appreciated that more or fewer mass analysis instruments 102 may be housed within the facility 104. For example, some facilities 104 may house hundreds of mass analysis instruments 102.

The mass analysis instruments 102 are configured to receive a sample and generate mass analysis results for the received sample. Testing of a sample generally requires multiple operations, including sample introduction, analyte ionization, mass analysis and ion detection, and data processing. Sample introduction may involve the mass analysis instrument 102 receiving an individual sample, multiple samples, and may also include chromatographic separation. During the analyte ionization operation, the sample or analyte from the sample introduction operation is ionized. For example, the mass analysis instrument 102 may produce gas phase ions that are suitable for use in the mass analysis and ion detection operations of the testing procedure. There are many different types of ionization techniques that can be used, such as electron ionization, chemical ionization, electrospray ionization, and matrix-assisted laser desorption ionization, among other techniques.

Once the ions are generated, the ions (having a mass m and z elementary charges e) may be accelerated with a voltage V into an electric field E and/or a magnetic field B along a path with a radius of curvature r. The different ions having different mass to charge ratios (m/z) can be distinguished by altering the electric field E, the magnetic field B, and/or the voltage V. For example, by changing the electric field E, the magnetic field B, and/or the voltage V, the ions travel along a different radius of curvature r. Thus, depending on when and where an ion is detected by a detector of the mass analysis instrument 102, the mass-to-charge ratio of the ion can be determined. Different types of mass analyzers or mass filters may be used to accomplish the manipulation or acceleration of the ions to allow for such types of detection. Some examples include quadrupole mass analyzers, ion-trap mass analyzers, time-of-flight mass analyzers, and orbitrap mass analyzers, among others.

Detection of the ions may be performed through the use of various detectors or detection systems. Some example detection systems utilize an electron multiplier detector or a microchannel plate detector. Based on the signals from the detection system, mass analysis results may be generated. The mass analysis results may be in the form of mass spectra for the sample being analyzed. A mass spectrum may represent a set of ion counts for a particular amount of time. The mass analysis results may be generated in different formats or manners. For instance, the mass analysis results may be presented or stored as a total-ion chromatogram (TIC), an extracted-ion chromatogram (XIC), a base-peak chromatogram (BPC), or other types of formats.

In the embodiment of system 100A, each of the mass analysis instruments 102 are in communication with a cloud-based server 106 and a local or on-premises server 106. The communication with the servers 106, 108 may be achieved through many different communication techniques or protocols. The communication may be achieved through wireless connections, wired connections, and/or a combination of wired and wireless connections. For instance, the communication may be achieved through the Internet based on various Internet protocols (IP), such as the transmission control protocol (TCP), User Datagram Protocol (UDP), Internet Control Message Protocol (ICMP), Hypertext Transfer Protocol (HTTP), Post Office Protocol (POP), and/or File Transfer Protocol (FTP), and/or Internet Message Access Protocol (IMAP), among other types of communication protocols. The data generated from the mass analysis instruments may be communicated to the servers and stored on the servers. Accordingly, additional data increases both bandwidth and storage requirements for the facility 104.

The cloud-based server 106 and/or the local server 108 may include a single server or a plurality of servers that operate together to execute the algorithms and operations described herein. The cloud-based server 106 may be part of cloud-based computing platform or hosting platform, such as the Amazon Web Services (AWS) platform from Amazon.com, Inc. of Seattle, Washington, or the Azure platform available from Microsoft Corporation of Redmond, Washington.

Figure 2:
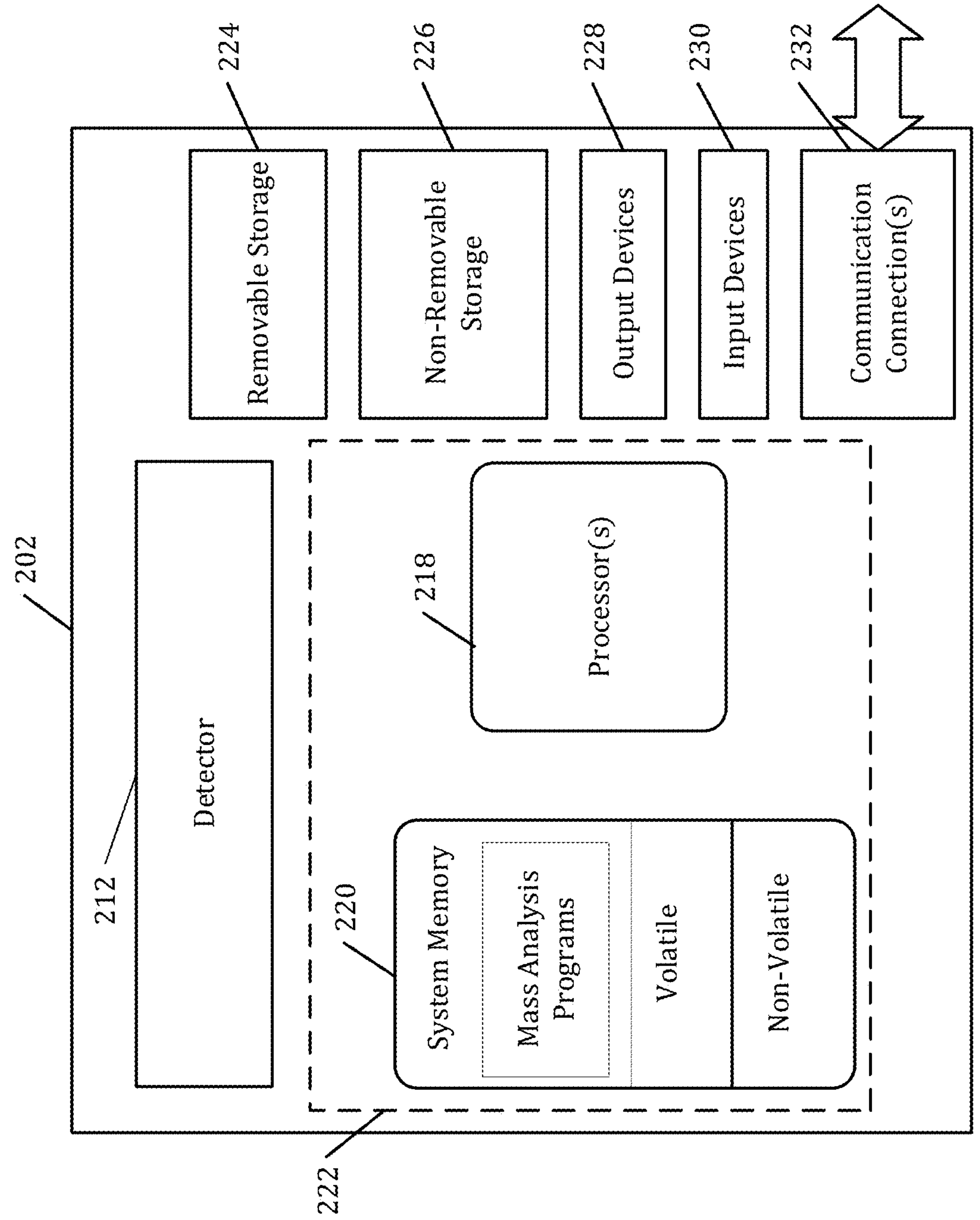
FIG. 2 depicts an example mass spectrometry instrument.

FIG. 2 depicts example electronic and computing elements of an example mass analysis instrument 202. The mass analysis instrument may include computing components 222. The computing components 222 may be housed within the mass analysis instrument 202 itself, located adjacent to the mass analysis instrument 202, or be in electronic communication with the mass analysis hardware and components 204. In its most basic configuration, the computing components 222 typically include at least one processor 218 and memory 220. Depending on the exact configuration, memory 220 (storing, among other things, mass analysis programs and instructions to perform the operations disclosed herein) can be volatile (such as RAM), non-volatile (such as ROM, flash memory, etc.), or some combination of the two. Further, the mass analysis instrument 202 may also include storage devices (removable, 224, and/or non-removable, 226) including, but not limited to, solid-state devices, magnetic or optical disks, or tape. Further, mass analysis instrument 202 may also have input device(s) 230 such as touch screens, keyboard, mouse, pen, voice input, etc., and/or output device(s) 228 such as a display, speakers, printer, etc. One or more communication connections 232, such as local-area network (LAN), wide-area network (WAN), point-to-point, Bluetooth, RF, etc., may also be incorporated into the mass analysis instrument 202. The mass analysis instrument 212 also includes a detector 212. The detector 212 may be any one of a variety of detectors or detection systems. Some example detection systems include an electron multiplier detector or a microchannel plate detector. The detector 212 is in communicatively connected to the computing components 222 such that signals generated by the detector can be processed and stored by the computing components 222.

Figure 3:
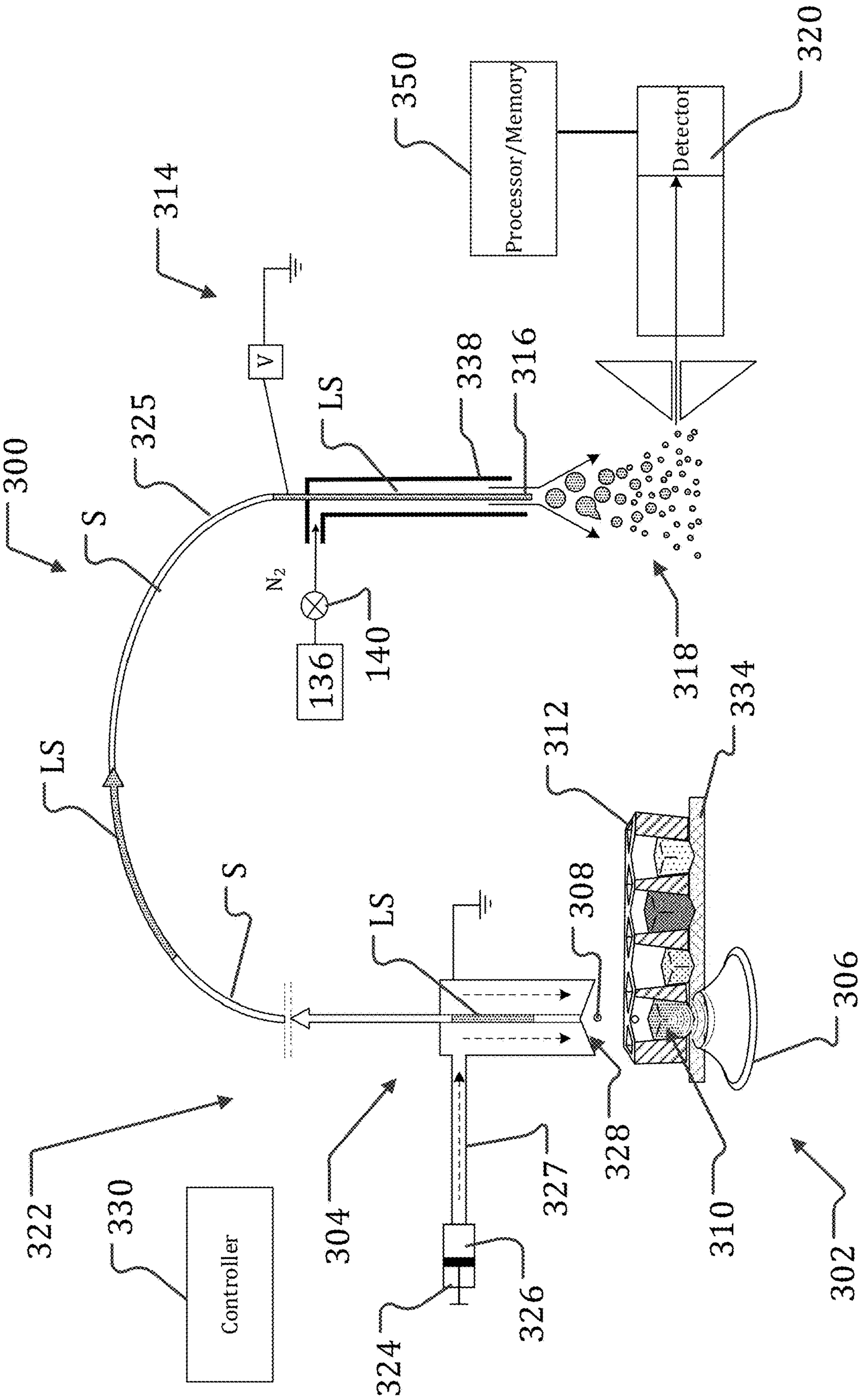
FIG. 3 depicts an example mass spectrometry system using acoustic ejection.

FIG. 3 depicts a schematic view of an example system 300 combining an ADE 302 with an OPI sampling interface 304 and ESI source 314. The system 300 may be a mass analysis instrument, or part of a mass analysis instrument, such as a mass spectrometry device that is for ionizing and mass analyzing analytes received within an open end of a sampling OPI. Such a system 300 is described, for example, in U.S. Pat. No. 10,770,277, the disclosure of which is incorporated by reference herein in its entirety. The ADE 302 includes an acoustic ejector 306 that is configured to eject a droplet 308 from a reservoir 312 into the open end of sampling OPI 304. As shown in FIG. 3, the example system 300 generally includes the sampling OPI 304 in liquid communication with the ESI source 314 for discharging a liquid containing one or more sample analytes (e.g., via electrospray electrode 316) into an ionization chamber 318, and a mass analyzer detector (depicted generally at 320) in communication with the ionization chamber 318 for downstream processing and/or detection of ions generated by the ESI source 314. Due to the configuration of the nebulizer probe 338 and electrospray electrode 316 of the ESI source 314, samples ejected therefrom are in the gas phase. A liquid handling system 322 (e.g., including one or more pumps 324 and one or more conduits 325) provides for the flow of a transport fluid or liquid from a solvent reservoir 326 to the sampling OPI 304 and from the sampling OPI 304 to the ESI source 314. The solvent reservoir 326 (e.g., containing a liquid, desorption solvent) can be liquidly coupled to the sampling OPI 304 via a supply conduit 327 through which the transport fluid or liquid can be delivered at a selected volumetric rate by the pump 324 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of transport fluid or liquid into and out of the sampling OPI 304 occurs within a sample space accessible at the open end such that one or more droplets 308 can be introduced into the liquid boundary 328 at the sample tip and subsequently delivered to the ESI source 314.

The system 300 includes an ADE 302 that is configured to generate acoustic energy that is applied to a liquid contained within a reservoir 310 that causes one or more droplets 308 to be ejected from the reservoir 310 into the open end of the sampling OPI 304. A controller 330 can be operatively coupled to the ADE 302 and can be configured to operate any aspect of the ADE 302 (e.g., focusing structures, acoustic ejector 306, automation elements 332 for moving a movable stage 334 so as to position a reservoir 310 into alignment with the acoustic ejector 306, etc.). This enables the ADE 306 to inject droplets 308 into the sampling OPI 304 as otherwise discussed herein substantially continuously or for selected portions of an experimental protocol by way of non-limiting example. Controller 330 can be, but is not limited to, a microcontroller, a computer, a microprocessor, or any device capable of sending and receiving control signals and data. Wired or wireless connections between the controller 330 and the remaining elements of the system 300 are not depicted but would be apparent to a person of skill in the art.

As shown in FIG. 3, the ESI source 314 can include a source 336 of pressurized gas (e.g., nitrogen, air, or a noble gas) that supplies a high velocity nebulizing gas flow to the nebulizer probe 338 that surrounds the outlet end of the electrospray electrode 316. As depicted, the electrospray electrode 316 protrudes from a distal end of the nebulizer probe 338. The pressured gas interacts with the liquid discharged from the electrospray electrode 316 to enhance the formation of the sample plume and the ion release within the plume for sampling by mass analyzer detector 320, e.g., via the interaction of the high-speed nebulizing flow and jet of liquid sample (e.g., analyte-solvent dilution). The liquid discharged may include discrete volumes of liquid samples LS received from each reservoir 310 of the well plate 312. The discrete volumes of liquid samples LS are typically separated from each other by volumes of the solvent S (hence, as flow of the solvent moves the liquid samples LS from the OPI 304 to the ESI source 314, the solvent may also be referred to herein as a transport fluid). The nebulizer gas can be supplied at a variety of flow rates, for example, in a range from about 0.1 L/min to about 20 L/min, which can also be controlled under the influence of controller 330 (e.g., via opening and/or closing valve 340).

It will be appreciated that the flow rate of the nebulizer gas can be adjusted (e.g., under the influence of controller 330) such that the flow rate of liquid within the sampling OPI 304 can be adjusted based, for example, on suction/aspiration force generated by the interaction of the nebulizer gas and the analyte-solvent dilution as it is being discharged from the electrospray electrode 316 (e.g., due to the Venturi effect). The ionization chamber 318 can be maintained at atmospheric pressure, though in some examples, the ionization chamber 318 can be evacuated to a pressure lower than atmospheric pressure.

It will also be appreciated by a person skilled in the art and in light of the teachings herein that the mass analyzer detector 320 can have a variety of configurations. Generally, the mass analyzer detector 320 is configured to process (e.g., filter, sort, dissociate, detect, etc.) sample ions generated by the ESI source 314. By way of non-limiting example, the mass analyzer detector 320 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 300 including, for example, an ion mobility spectrometer (e.g., a differential mobility spectrometer) that is disposed between the ionization chamber 318 and the mass analyzer detector 320 and is configured to separate ions based on their mobility difference between in high-field and low-field. Additionally, it will be appreciated that the mass analyzer detector 320 can comprise a detector that can detect the ions that pass through the analyzer detector 320 and can, for example, supply a signal indicative of the number of ions per second that are detected.

During use of the mass spectrometry system 300 of FIG. 3, the delay time between acoustic ejections affects the throughput rate for analysis of a set of samples, such as samples in a well plate. Accordingly, by decreasing the delay time between ejections (which may be acoustic ejections, drop-on-demand ejections, etc.), the throughput rate can be increased.

Figure 4A:
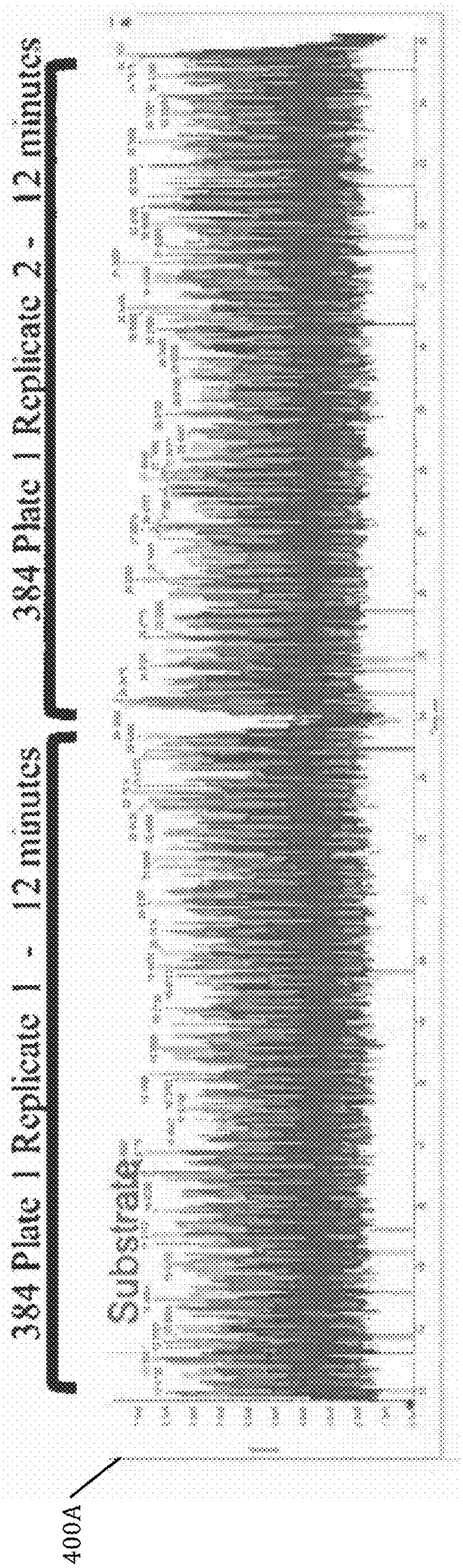
FIG. 4A depicts an example intensity plot for a background signal.

FIG. 4A depicts an example intensity plot 400A for a background or a substrate signal. The intensity plot includes time on the x-axis and intensity on the y-axis. The intensity is an ion count rate from a detector. The intensity may be for an MRM analysis where the intensity signal is for ions having a mass-to-charge ratio within a targeted range. The signal represented in the plot 400A is a background or substrate signal. The background signal may be generated from a transport fluid of an AEMS system. The background signal may also be generated by ejecting samples from a well-plate including only solvents or other non-analyte compounds that are not the subject of the desired analysis. Accordingly, the signal represents the background or substrate signal that would also be present during an analysis of wells containing a sample or analyte.

Based on the background signal for a substrate, such as the signal shown in plot 400A, a threshold for the background signal, such as a background count rate threshold, may be generated or determined. The background count rate threshold may be based on an average, a maximum, a minimum, and/or a statistical deviation of the background signal. For example, the background count rate threshold may be one standard deviation above the average of the background signal.

Figure 4B:
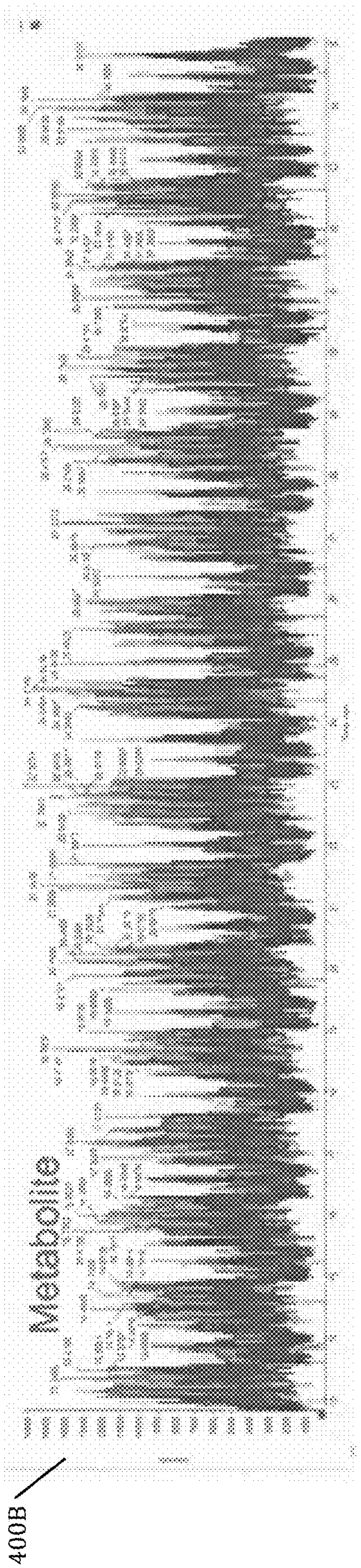
FIG. 4B depicts an example intensity plot for a sample signal.

FIG. 4B depicts an example intensity plot 400B for a sample signal. Like the intensity plot 400A, the x-axis of the intensity plot 400B represents time and the y-axis represents intensity. The example plot 400B is for a well plate having wells that was analyzed twice. The well plate, however, includes samples, metabolites, or analytes that are to be analyzed. Thus, the signal in plot 400B represents a time-based intensity signal for the analytes and the transport fluid. As can be seen from the plot 400B, the intensity signal includes a significant amount of data over the analyzed time period. For example, the signal in plot 400B represents intensity measurements at each sampling period for the detector over the entire time period for the analysis. The underlying data for that signal requires substantial memory to be stored and utilizes substantial bandwidth to transmit. Further, processing such data after it is generated may also require substantial processing or computing power. While some general peaks can be detected from the signal, the total amount of data represented by the signal may not be necessary for many applications. For instance, as discussed above, the desired output for many applications (such as an MRM analysis) is a single intensity value for each well of the well-plate that represents the amount or concentration of an analyte in the respective well. The signal in plot 400B thus represents a significantly larger amount of data than what would be necessary for such an application.

Figure 4C:
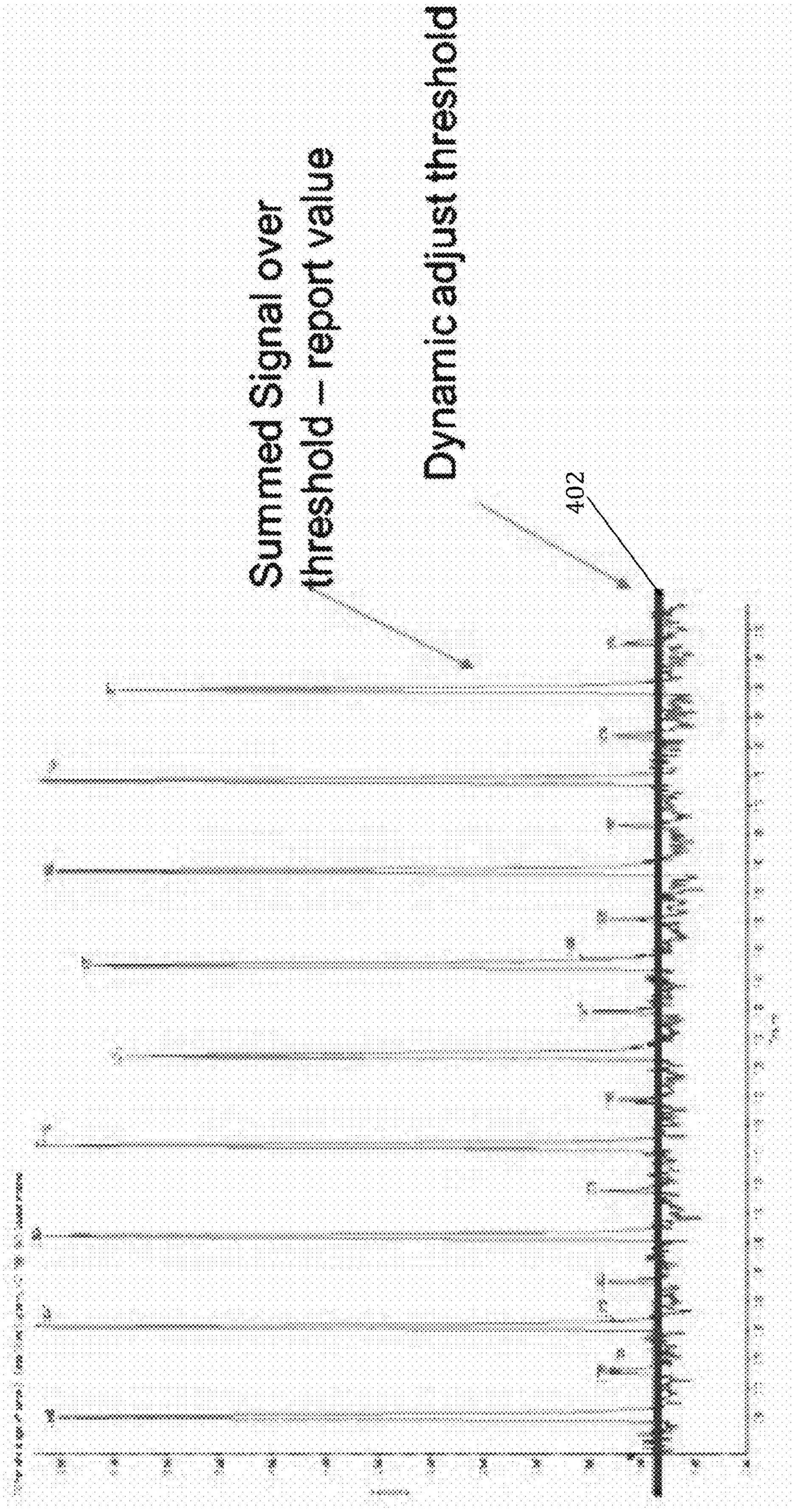
FIG. 4C depicts an example plot for a summed signal.

FIG. 4C depicts an example plot 400C for a summed signal. The signal in plot 400C represents summed signals that occur over a threshold. The signal in plot 400C is also generated from the analysis of wells of a well plate including an analyte, similar to the analysis performed to generate the signal in plot 400B in FIG. 4B. The plot 400C depicts the summed signal for points where the signal exceeds a background count rate threshold 402. The background count rate threshold may be the rate threshold discussed above that is generated from the background signal. For instance, when a intensity signal such as the signal in plot 400B is above a threshold, the signal is summed to while the signal is above the threshold to generate the summed signal shown in FIG. 4C.

Figure 4D:
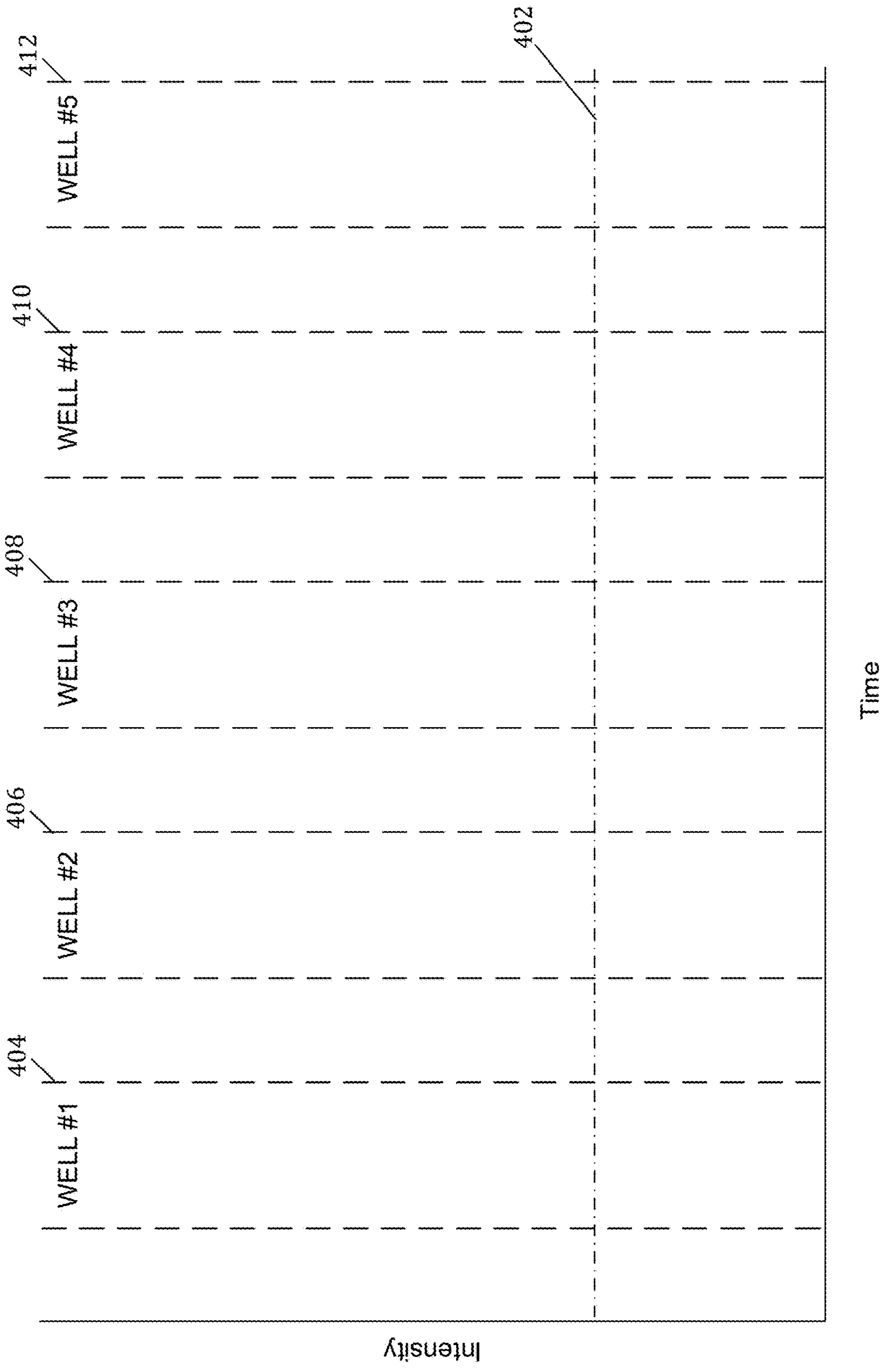
FIG. 4D depicts an example plot with a rate threshold and time windows.

FIG. 4D depicts an example plot 400D with a background count rate threshold 402 and time windows 404-412. The background count rate threshold 402 indicates a background rate threshold similar to the rate threshold 402 shown in FIG. 4C. The background count rate threshold serves as a signal intensity threshold such that the signal is summed or accumulated only when the signal is above the background threshold 402. The time windows 404-412 are related to the time at which a sample was ejected from the well. Each time window 404-412 may have a starting time, an ending time, and a duration (e.g., the difference between the starting time and ending time).

Each time window 404-412 may indicate a time at which ions generated from an ejection of a particular well of the well plate should be detected. For example, a first time window 404 may correspond to a first well of the well plate, a second time window 406 may correspond to a second well of the well plate, a third time window 408 may correspond to a third well of the well plate, a fourth time window 410 may correspond to a fourth well of a well plate, and a fifth time window 412 may correspond to a fifth well of the well plate. Additional time windows may also exist for the remainder of the wells on the well plate.

To determine the intensity of an analyte for a particular well, the signal may be summed or accumulated during the time window corresponding to the particular well. For instance, the intensity of the first well of a well plate may be determined by summing or accumulating the signal that is present in the first time window. As an example, ions detected during the first time window may all be summed or accumulated and that sum may be utilized to generate the intensity for the first well. In some examples, the detected ions are only summed when the count rate is higher than the background rate threshold 402. In other examples, all the ions detected during the time window may be summed, and an average background rate over the duration of the time window may be subtracted from the summed ion total to determine the intensity for the analyte in the well.

The starting time of the window is based on the ejection time of the sample from the well. As an example, from the time the sample is ejected from the well, there is a delay until ions from the sample are detected by the detector. For instance, with an AEMS system, a sample droplet from a well travels into an OPI, through a conduit, and into an ESI where the droplet is ionized. The ions from the droplet are then accelerated through the mass spectrometer where they are detected by the detector. That travel time from ejection to detection may be determined empirically, analytically, and/or experimentally. For instance, a test sample may be ejected from a well and then detected. The travel time may be determined from such a test. In addition, the duration of the time windows may be similarly determined. When a droplet is ejected from a well, ions generated from the droplet will be detected for an amount of time that can be determined empirically, analytically, and/or experimentally. For instance, the time from when ions from the test sample are detected until ions from the test sample are no longer detected may be used to determine a duration or ending time for the time window.

In some examples, such as the example shown in FIG. 4D, the time windows may be spaced apart in time. For instance, the first time window 404 is spaced apart from the second time window 406. The spacing between the windows may be based on a delay time between ejections from the respective wells on the well plate. For example, the ejection of the sample from the second well may occur one second after the ejection of the sample from the first well. The duration of the first time window, however, may be less than one second. Accordingly, a spacing or delay time may be present between the first time window 404 and the second time window 406. Different delay times between well ejections may also occur. Thus, the spacing or starting times of various time windows may not be consistent where there are variable ejection delays.

In some examples, the duration of each time window may be the same. Where the samples in different wells on a well plate include similar compounds and fluids, the time that the ions from a sample droplet travel through the system may be relatively the same. In other examples, where the samples are significantly different and their different properties are known before analysis, the duration of the time windows may be adjusted. For instance, larger or multiple droplets that are ejected from a sample may require a greater duration for the time window corresponding to the well from which such a sample is ejected. Accordingly, the durations for the time windows may be set based on the samples in the well plate.

Figure 5:
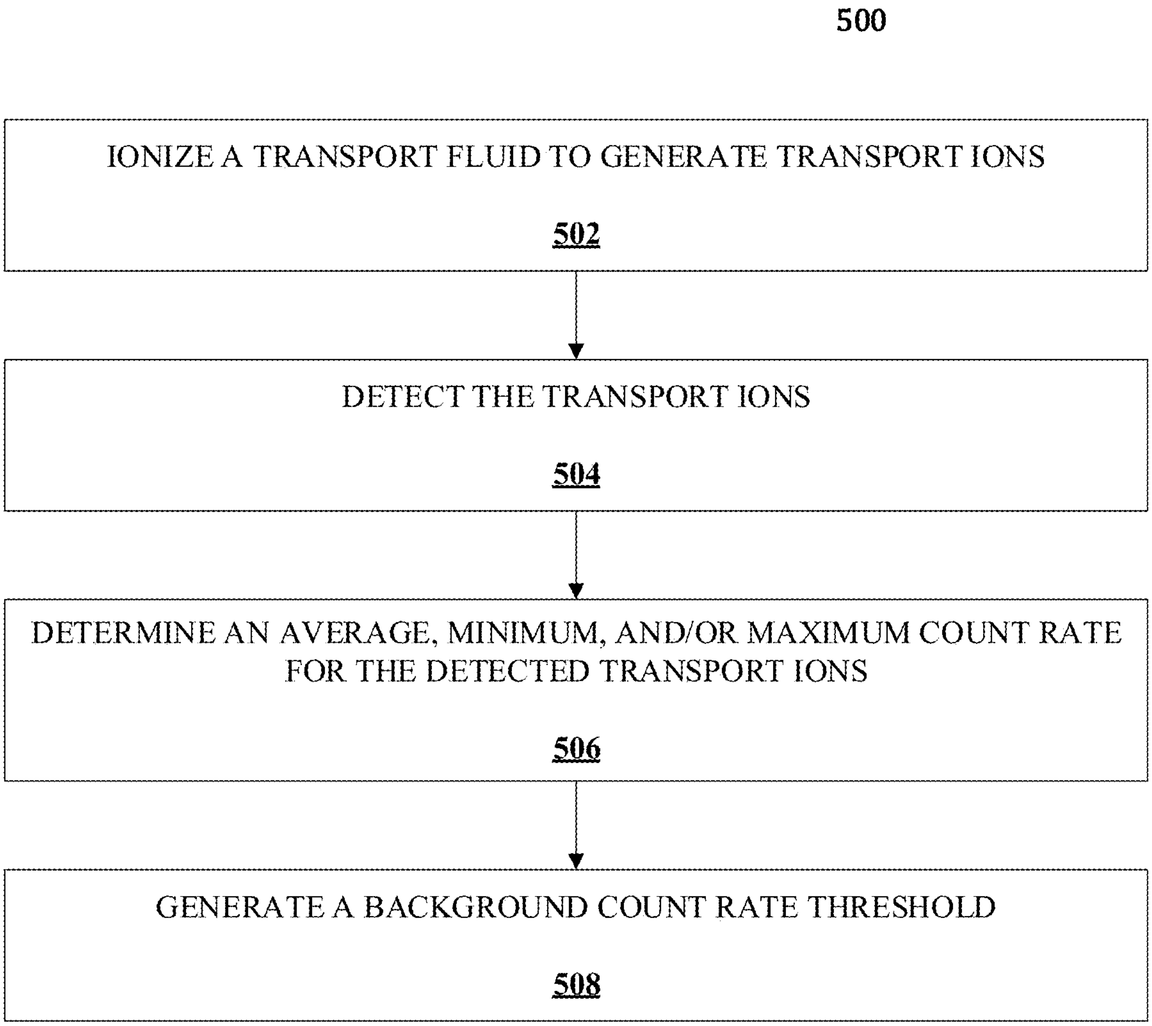
FIG. 5 depicts an example method for generating a background threshold.

FIG. 5 depicts an example method 500 for generating a background count rate threshold. In some examples, each of the operations in method 500 are performed by a processor of the mass analysis instrument according to firmware stored in memory of the mass analysis instrument. At operation 502, a transport fluid is ionized to generate transport ions from the transport fluid. The transport fluid may be the transport fluid in the AEMS system discussed above and depicted in FIG. 3. The transport fluid that is ionized in operation 502 does not include a sample or analyte that is the subject of a mass spectrometry analysis. The transport ions are accelerated through a mass analysis device, and the transport ions are then detected by a detector at operation 504. The detector may generate a count rate of the transport ions at each sampling period for the detector over an amount of time. An intensity signal may be generated based on the detected transport ions, such as the intensity signal shown in FIG. 4A.

Based on the count rate of the detected transport ions, one or more statistical values of the count rate may be determined or calculated. For instance, an average, minimum, and/or maximum of the count rate signal may be determined or calculated at operation 506. At operation 508, a background count rate threshold is generated. The background count rate threshold may be based on the statistical values, such as the average, minimum, and/or maximum determined at operation 508. For example, the background count rate threshold may be set as the average of the background count rate. In another example, the background count rate threshold may be set as one standard deviation above the average of the background count rate. The background count rate threshold may represent a count rate level for the transport fluid. Accordingly, the background count rate may be later used to distinguish ion counts due to an analyte or a sample as compared to the transport fluid itself.

Figure 6:
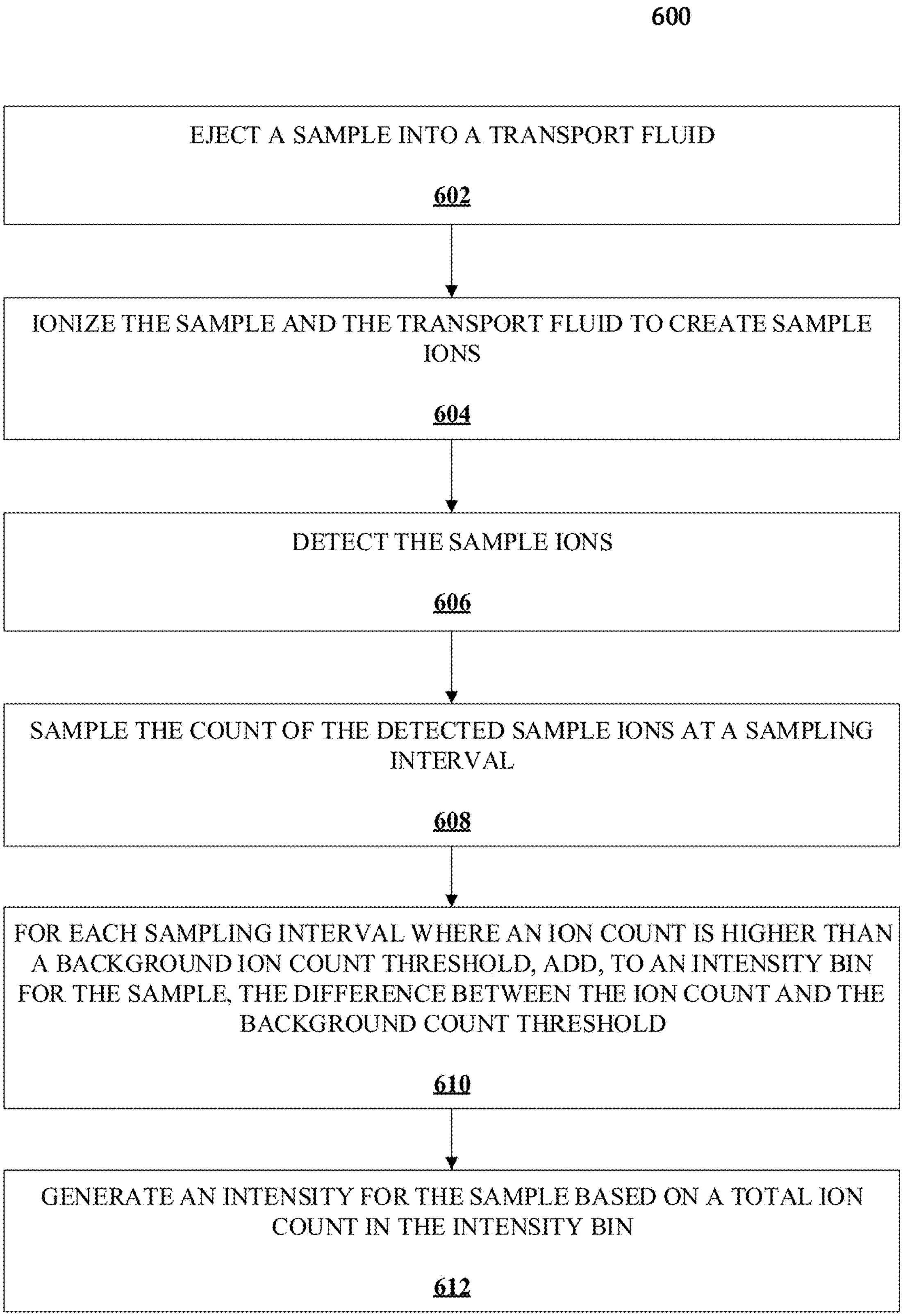
FIG. 6 depicts an example method for generating an intensity for a sample.

FIG. 6 depicts an example method 600 for generating an intensity of an analyte for a sample. In some examples, each of the operations in method 600 are performed by a processor of the mass analysis instrument according to firmware stored in memory of the mass analysis instrument. At operation 602, a sample is ejected into a transport fluid. The sample may be ejected from a well of a well plate or from some other source. For example, the sample may be acoustically ejected such that one or more droplets from the well are received by an OPI and carried by the transport fluid. At operation 604, the sample and transport fluid carrying the sample are ionized, such as by an ESI, to generate sample ions. The sample ions necessarily include ions of the sample and the transport fluid. The sample ions are accelerated through a mass analysis device, and the sample ions are then detected by a detector at operation 606. The detection of the sample ions may involve sampling the counted ions from the detector at a sampling rate. In such examples, at operation 608, the count of the detected sample ions is sampled from the detector at a sampling interval. Based on the sampling interval and the number of ions counted or detected in the sampling interval, a count rate data point may be generated for that sampling interval.

As the sample ions are detected, the count rate of the detected sample ions is analyzed and compared to a background count rate threshold, such as the background count rate threshold generated by method 500 depicted in FIG. 5. As an example, at operation 610, for each sampling interval where an ion count is higher than the background count threshold, the difference between the ion count and the background count threshold is added to an intensity bin for the sample. As used herein, a "bin" may be considered a form of computerized storage, such as a data structure. The bin may take many forms, such as a variable, object, or other structure for which a number can be stored and adjusted. For example, if the ion count for a sampling interval is greater than the background count threshold for the sampling interval, the difference between the ion count and the background count threshold is added to an intensity bin for the sample. Effectively, the summing of ions may produce a similar result as integrating the area between the count rate signal and background count rate threshold to produce a number of ions represented by that area. With the present technology, however, the full time-dependent count-rate signal and the massive amount of data that it requires may no longer be necessary and may not need to be stored.

This process of adding ions to the intensity bin may continue for a set period of time for the sample, such as a time window for the particular sample. As an example, for the time occurring within a time window for the sample, detected ions are added to the intensity bin for every sampling interval that has an ion count rate greater than the background count rate.

Based on the total ion count in the intensity bin for the sample, an intensity of the targeted analyte for the sample may be generated at operation 612. A report indicating the sample intensity may also be generated indicating the intensity and/or the total ion count, which may be the same in some examples. The report and/or the intensity for the sample may be stored locally in the mass analysis instrument and/or transmitted to another device.

Figure 7A:
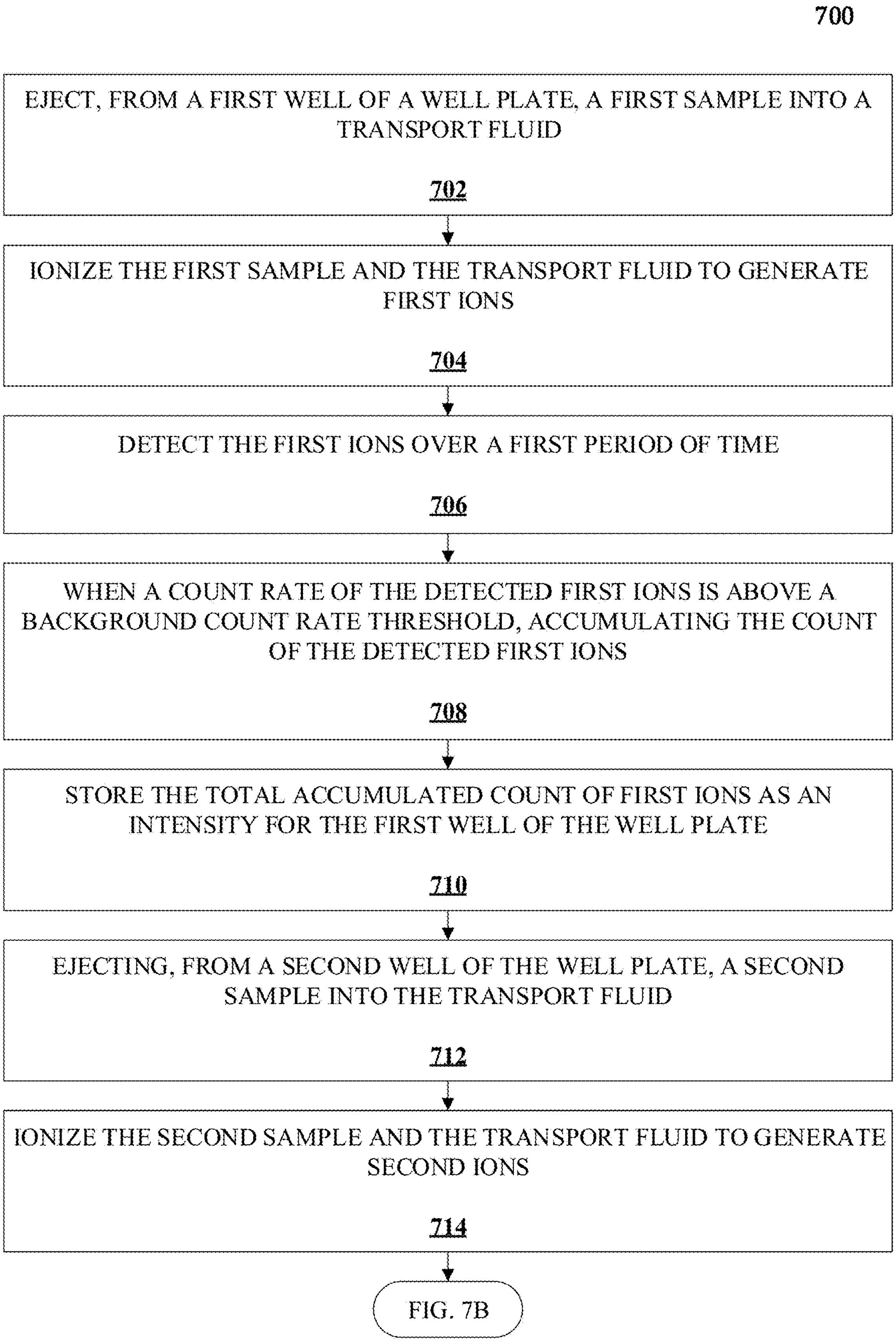
FIGS. 7A-7B depicts an example method for generating intensities for multiple wells of a well plate.
Figure 7B:
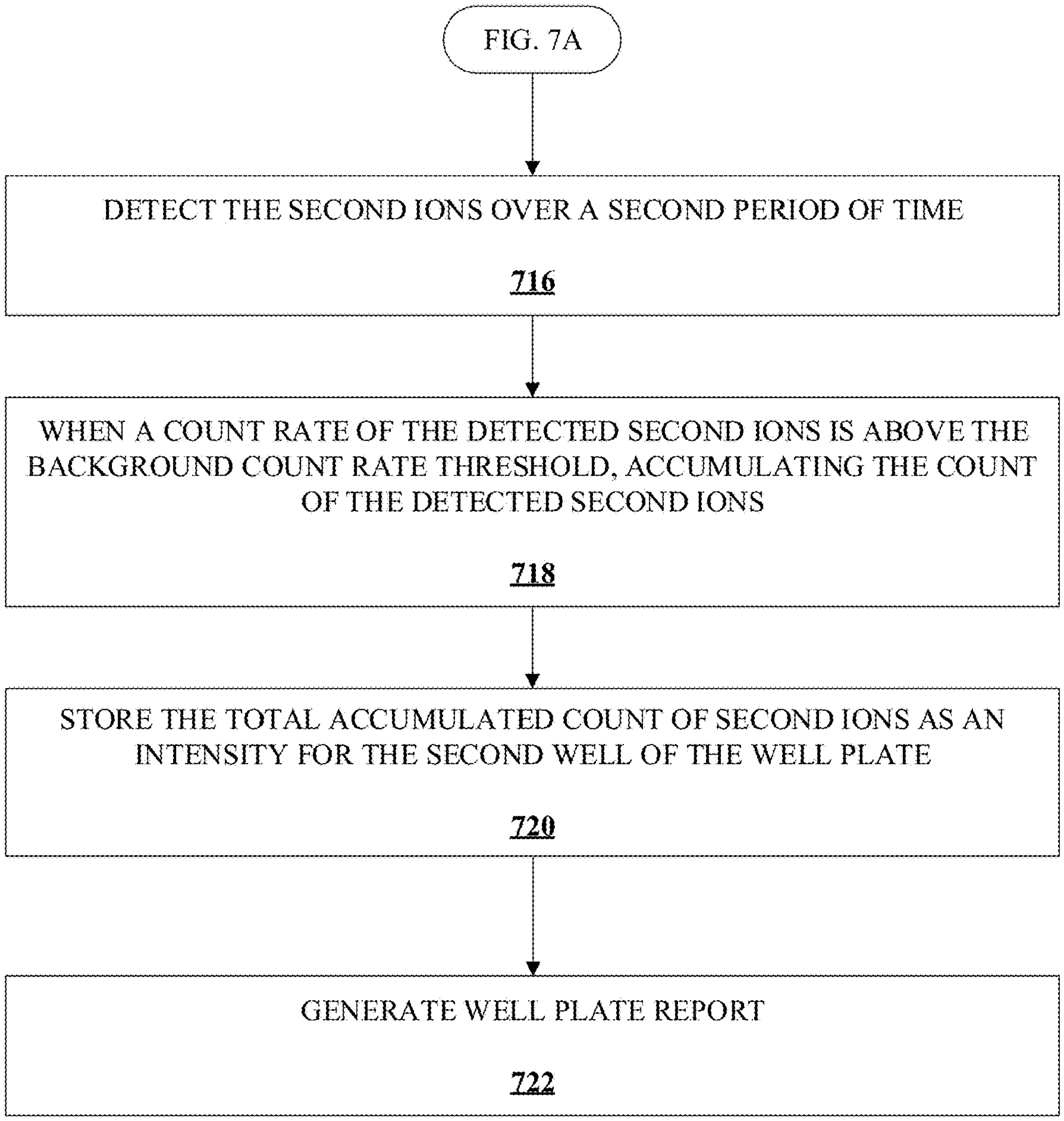

FIGS. 7A-7B depicts an example method 700 for generating intensities for multiple wells of a well plate. In some examples, each of the operations in method 700 are performed by a processor of the mass analysis instrument according to firmware stored in memory of the mass analysis instrument. At operation 702, a first sample in a first well of a well plate is ejected into a transport fluid. For example, a droplet of the first sample may be acoustically ejected into an OPI of an AEMS system, where the first sample is carried by the transport fluid to an ionization device, such as an ESI. At operation 704, the ejected first sample and the transport fluid are ionized to generate first ions. The first ions are accelerated through a mass analysis device, and the first ions are then detected by a detector at operation 706. The detection of the first ions may involve sampling the counted ions from the detector at a sampling rate and generating a count rate for the first ions.

At operation 708, when a count rate of the detected first ions is above a background count rate threshold, a count of the detected first ions is accumulated into a first bin corresponding to the first well of the well plate. As an example, the number of first ions that are counted when that condition (e.g., count rate>threshold) is satisfied are accumulated into a first bin. The number of first ions that is accumulated may be adjusted based on the background rate threshold. For instance, the total counted first ions may be reduced by a number of ions corresponding to the background rate threshold and the duration that the first ions are counted when the counted first ions are accumulated into the first bin. Similar to the summing discussed above with respect to FIG. 6, the accumulation process may provide a result that is the same or similar to integrating the area between the count rate signal and the background count rate threshold for the time period. The background count rate threshold may be the background count rate threshold generated by method 500 depicted in FIG. 5.

The counted first ions may be accumulated into the first bin for a time period. The time period may be based on when the first ion count rate first exceeds the background count rate threshold and when the first ion count rate drops below the background count rate threshold. The time period may also be a time window, such as the time windows discussed above in FIG. 4D, based on the time at which the first sample was ejected from the first well. In some examples, the time period and/or time window may be between 0.2 and 2 seconds.

At operation 710, the total accumulated count of the first ions in the first bin is stored as an intensity for the first well of the well plate. The intensity may be stored as a part of an array for the entire well plate. The intensity may also be stored as a separate record for the first well such that the record is stored separately from the data regarding other wells in the well plate. Such an implementation may be beneficial where the well plate includes different sensitive samples, such as blood samples, from different people.

The operations 702-710 are substantially repeated again for each well of the well plate. For instance, at operation 712, a second sample from a second well of the well plate is ejected into the transport fluid. At operation 714, the ejected second sample and the transport fluid are ionized to generate second ions. The second ions are accelerated through a mass analysis device, and the second ions are then detected by the detector at operation 716. The detection of the second ions may involve sampling the counted ions from the detector at a sampling rate and generating a count rate for the second ions.

At operation 718, when a count rate of the detected second ions is above the background count rate threshold, the count of the detected ions is accumulated into a second bin corresponding to the second well of the well plate. The number of second ions that are accumulated may be adjusted based on the background rate threshold. For instance, the counted second ions may be reduced by a number of ions corresponding to the background rate threshold and the duration that the second ions are counted when the counted second ions are accumulated into the second bin.

The counted second ions may be accumulated into the second bin for a time period. The time period may be based on when the second ion count rate first exceeds the background count rate threshold and when the second ion count rate drops below the background count rate threshold. The time period may also be a time window, such as the time windows discussed above in FIG. 4D, based on the time at which the second sample was ejected from the first well. The time period for accumulating the counted second ions may have the same or different duration as the time period for accumulating the counted first ions.

At operation 720, the total accumulated count of the first ions in the second bin is stored as an intensity for the second well of the well plate. The intensity may be stored as a part of an array for the entire well plate. The intensity may also be stored as a separate record for the second well such that the record is stored separately from the data regarding other wells in the well plate.

At operation 722, a well plate report may be generated based on the stored intensity for the first well and the stored intensity for the second well. The well plate report may be a report that separately lists each well of the well plate and the determined intensity. If the analysis of the wells was intended to determine if the intensity is above or below a threshold, the well plate report may also indicate the result. For instance, the well plate report may provide a yes/no (or pass/fail) indication for the well of the well plate. Accordingly, by performing the methods discussed herein, the mass analysis system may serve as a well plate reader that can quickly generate intensities for each well of the well plate without having to store or export large time-dependent signals. As should be appreciated, while the method 700 is discussed with respect to two wells, the method may be expanded to include additional wells, such as all wells on a well plate. In such examples, the generated report may be for the entire well plate.

Figure 8:
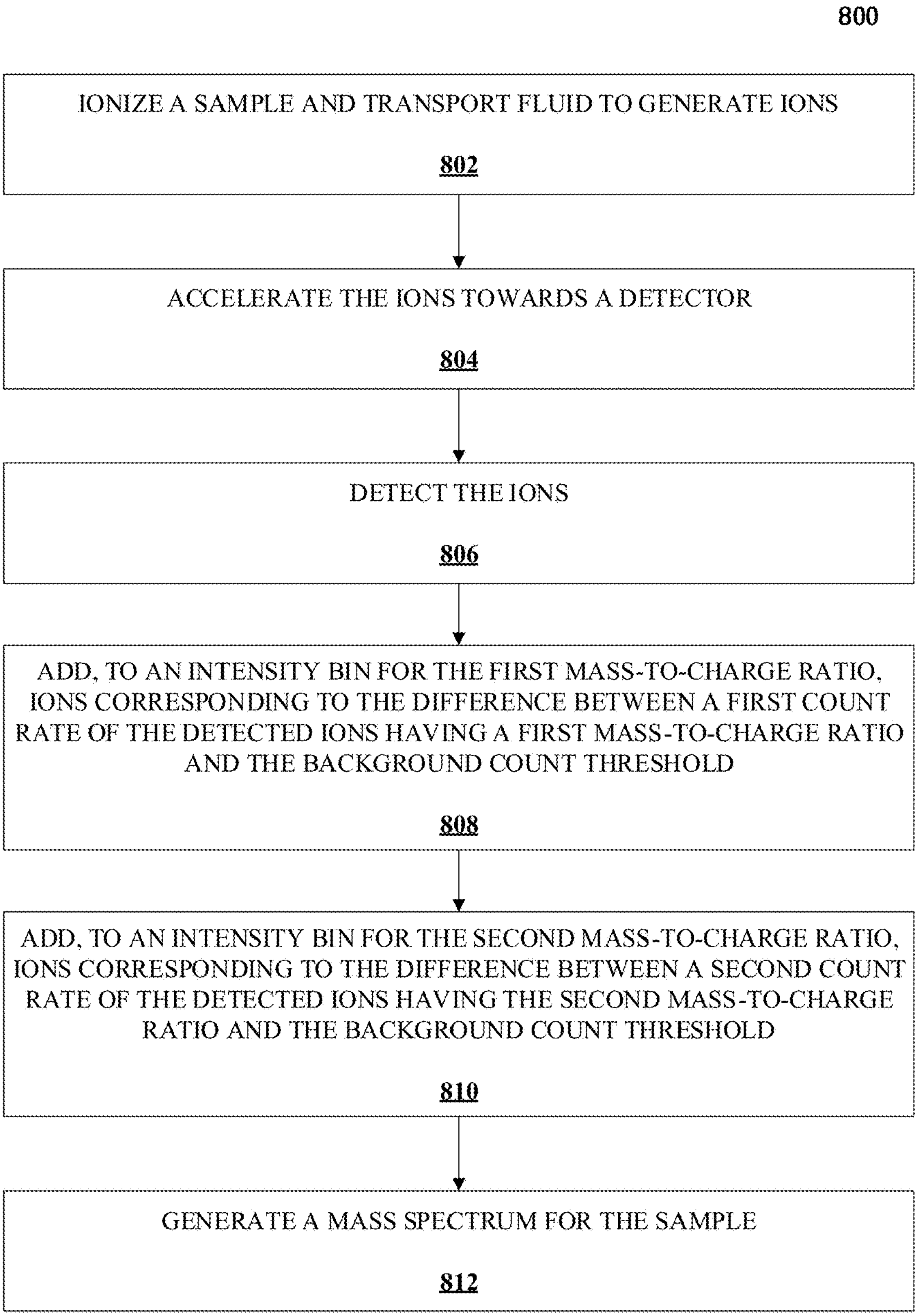
FIG. 8 depicts an example method for generating a mass spectrum.

FIG. 8 depicts an example method 800 for generating a mass spectrum. In some examples, each of the operations in method 800 are performed by a processor of the mass analysis instrument according to firmware stored in memory of the mass analysis instrument. The present technology may also be utilized for more efficiently generating a mass spectrum rather than a single intensity value for a sample. For instance, the present technology may be used in time-of-flight (ToF) analyses where intensities for multiple charge-per-mass (m/z) positions are generated. To do so, background count rate thresholds may be generated for m/z ranges. To generate the m/z background count rate thresholds, a transport fluid or other substrate without a sample may be ionized and the resultant ions may be detected in a ToF analysis. The background count rate at each m/z position, or a set of m/z ranges, may be analyzed to determine background count rate thresholds.

At operation 802, a sample and a transport fluid are ionized to generate ions. The transport fluid may be a transport fluid of an AEMS system or some other type of transport fluid, solvent, substrate, etc. At operation 804, the generated ions are accelerated through a mass analysis device, and the ions are then detected by a detector at operation 806. As will be appreciated by those having skill in the art, based on the flight characteristics of the ions, a m/z value for each of the detected ions may be determined. A count rate for ions having a particular m/z value or ratio, or within an m/z range, may then be generated. For instance, a count rate for ions having a first m/z value and a count rate for ions having a second m/z value may be generated.

At operation 808, when a first count rate of the detected ions having a first m/z value or ratio is greater than a background count rate threshold for the first m/z value or ratio, counted ions representing or corresponding to the difference between the first count rate and the background count rate threshold for the first m/z value are added to an intensity bin for the first m/z value. For instance, when the first count rate is higher than the background count rate threshold for the first m/z value, the counted ions during that period are added to a corresponding intensity bin. The counted ions may be based on the difference between the count rate and the background count rate threshold for the time period for which the counted ions are added to the intensity bin. In some sense, the counted ions represent an integration of the area between the count rate signal and the background count rate threshold.

At operation 810, when a second count rate of the detected ions having a second m/z value is greater than a background count rate threshold for the second m/z value, counted ions representing or corresponding to the difference between the second count rate and the background count rate threshold for the second m/z value are added to an intensity bin for the second m/z value. Operation 808 is similar to operation 810 but for a second m/z value. While only two m/z values or ranges are discussed in method 800, additional similar operations may be performed for additional m/z values for ranges.

At operation 812, a mass spectrum for the sample is generated. The mass spectrum is based on the count of ions in the respective intensity bins. For instance, the mass spectrum includes an intensity at each m/z location for which there exists an intensity bin to which an ion count has been added. As an example, at the first m/z value, the intensity in the mass spectrum is based on the total ion count in the first intensity bin. Similarly, at the second m/z value, the intensity is based on the total ion count in the second intensity bin.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved. In addition, the operations depicted in the block diagram may be performed by a suitable computing device, such as the computing components within a mass analysis instrument, an on-premises server, and/or a cloud-based server.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for performing mass analysis, the method comprising:

ejecting, from a first well of a well plate, a first sample into a transport fluid;

ionizing the first sample and the transport fluid to generate first ions;

detecting the first ions over a first period of time;

when a count rate of the detected first ions is above a background count rate threshold, accumulating a count of the detected first ions;

storing the total accumulated count of first ions as an intensity for the first well of the well plate;

ejecting, from a second well of the well plate, a second sample into the transport fluid;

ionizing the second sample and the transport fluid to generate second ions;

detecting the second ions over a second period of time;

when a count rate of the detected second ions is above the background count rate threshold, accumulating a count of the detected second ions; and storing the total accumulated count of second ions as an intensity for the second well of the well plate, wherein the first time period is based on a time of ejection of the first sample and a time of ejection of the second sample.

2. The method of claim 1, further comprising generating a report for the well plate, wherein the report includes the first intensity correlated with the first well and the second intensity correlated with the second well.

3. The method of claim 1, wherein the background count rate threshold is based on a count rate for the transport fluid.

4. The method of claim 3, further comprising generating the background count rate threshold by:

ionizing the transport fluid to generate transport ions;

detecting the transport ions;

determining an average count rate of the detected transport ions; and generating the background count rate threshold based on the determined average count rate.

5. The method of claim 1, wherein the first sample is acoustically ejected as a droplet from the first well.

6. The method of claim 1, wherein the first time period begins when the count rate of the detected first ions is first above the background count rate threshold and ends when the count rate of the detected first ions falls below the background count rate threshold.

7. The method of claim 1, wherein the first time period is between 0.2 to 2 seconds.

8. The method of claim 1, wherein the method is performed as a multiple reaction monitoring (MRM) analysis of the sample.

* * * * *